(12) United States Patent
Gill

(10) Patent No.: US 8,573,216 B2
(45) Date of Patent: Nov. 5, 2013

(54) VERTICAL DROP OUT BOX METHOD AND APPARATUS

(75) Inventor: Christopher F. Gill, Orchard Park, NY (US)

(73) Assignee: Avox Systems Inc., Lancaster, NY (US)

( * ) Notice: Subject to any disclaimer, the term of this patent is extended or adjusted under 35 U.S.C. 154(b) by 273 days.

(21) Appl. No.: 13/011,876

(22) Filed: Jan. 22, 2011

(65) Prior Publication Data

US 2012/0186586 A1   Jul. 26, 2012

(51) Int. Cl.
A62B 18/08    (2006.01)

(52) U.S. Cl.
USPC ............... 128/206.27; 128/205.25; 244/118.5

(58) Field of Classification Search
USPC ............. 128/204.18, 205.25, 206.21, 204.29, 128/206.27; 244/118.5; 221/87, 89; 220/323, 324, 326, 811–813, 820, 823, 220/827, 254.3–254.5; 454/173, 174, 182
See application file for complete search history.

(56) References Cited

U.S. PATENT DOCUMENTS

| | | | | | |
|---|---|---|---|---|---|
| 3,132,889 | A | * | 5/1964 | Damm | 294/82.26 |
| 3,730,604 | A | * | 5/1973 | Viera | 312/223.4 |
| 3,744,867 | A | * | 7/1973 | Shaw | 312/234 |
| 3,836,222 | A | * | 9/1974 | Kuntze | 312/9.57 |
| 3,981,302 | A | * | 9/1976 | Veit | 128/202.26 |
| 4,023,874 | A | * | 5/1977 | Jong et al. | 312/291 |
| 4,154,237 | A | * | 5/1979 | Courter | 128/206.27 |
| 4,481,945 | A | * | 11/1984 | Levine | 128/206.27 |
| 4,694,940 | A | * | 9/1987 | Horiuchi | 190/109 |
| 4,718,572 | A | | 1/1988 | Gosse et al. | |
| 5,634,702 | A | * | 6/1997 | Fistonich | 312/270.3 |
| 5,803,062 | A | * | 9/1998 | Aulgur | 128/202.26 |
| 5,816,244 | A | * | 10/1998 | Aulgur | 128/206.27 |
| 6,318,364 | B1 | * | 11/2001 | Ford et al. | 128/204.18 |
| 6,497,386 | B2 | * | 12/2002 | Martinez | 244/118.5 |
| 6,526,967 | B2 | | 3/2003 | Cordero et al. | |
| 6,755,194 | B2 | * | 6/2004 | Taieb | 128/206.27 |
| 7,309,045 | B2 | * | 12/2007 | Melberg et al. | 244/118.5 |
| 7,789,084 | B2 | * | 9/2010 | Rittner et al. | 128/204.18 |
| 2002/0020652 | A1 | | 2/2002 | Martinez | |
| 2002/0030140 | A1 | * | 3/2002 | Martinez | 244/118.5 |
| 2005/0045502 | A1 | * | 3/2005 | Okita | 206/308.1 |
| 2006/0169283 | A1 | | 8/2006 | Schaeffer et al. | |
| 2006/0237338 | A1 | * | 10/2006 | Nakamae | 206/316.1 |
| 2009/0151727 | A1 | * | 6/2009 | Schaeffer et al. | 128/205.25 |

* cited by examiner

*Primary Examiner* — Justine Yu
*Assistant Examiner* — Michael Tsai
(74) *Attorney, Agent, or Firm* — Hodgson Russ LLP

(57) ABSTRACT

The present invention provides a method and apparatus for storing breathing masks in a tall and narrow space and deploying the masks from that space. The apparatus may be embodied as a removable cartridge containing a breathing mask assembly housed within a frame. The cartridge is comprised of a first side and second side which can move relative to the frame. The first side includes a hinge. In operation, the cartridge slides relative to the frame and rotatably opens via the hinge after the cartridge substantially exits the frame. A breathing mask is released to a user after the first and second halves rotatably separate.

20 Claims, 6 Drawing Sheets

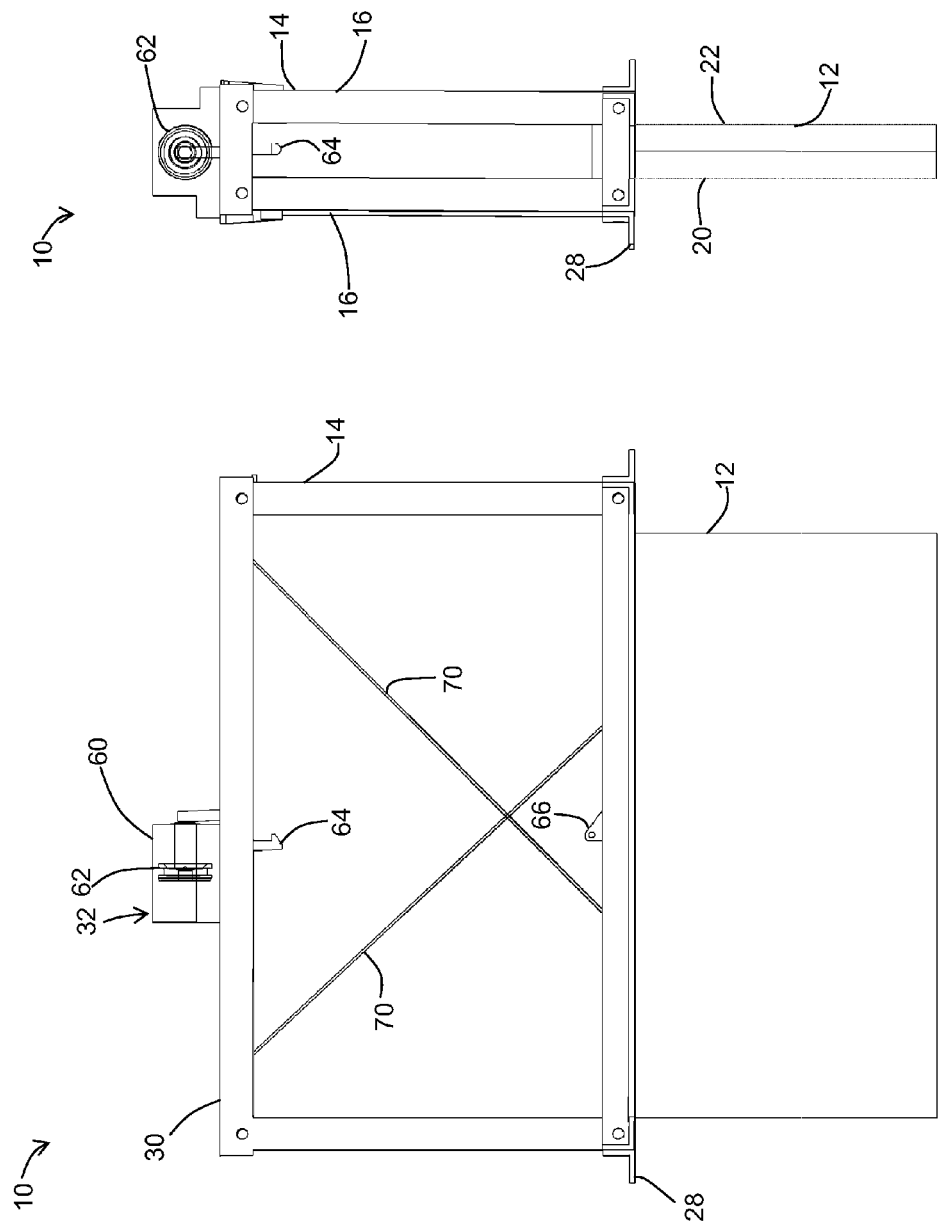

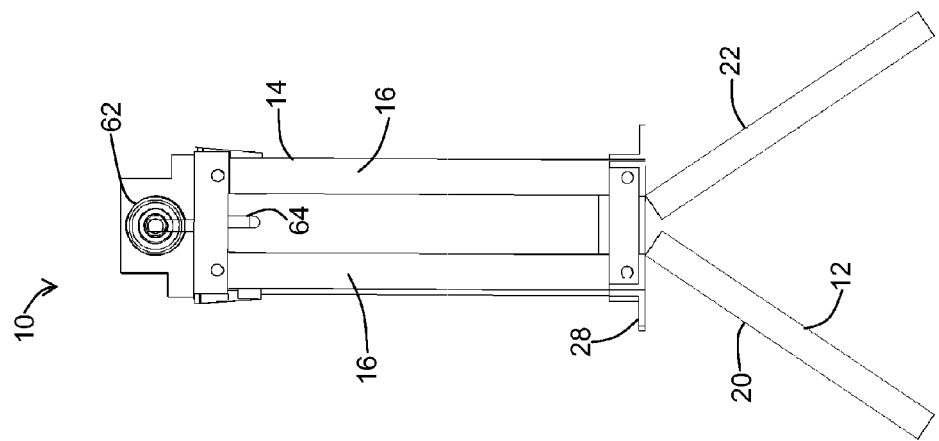
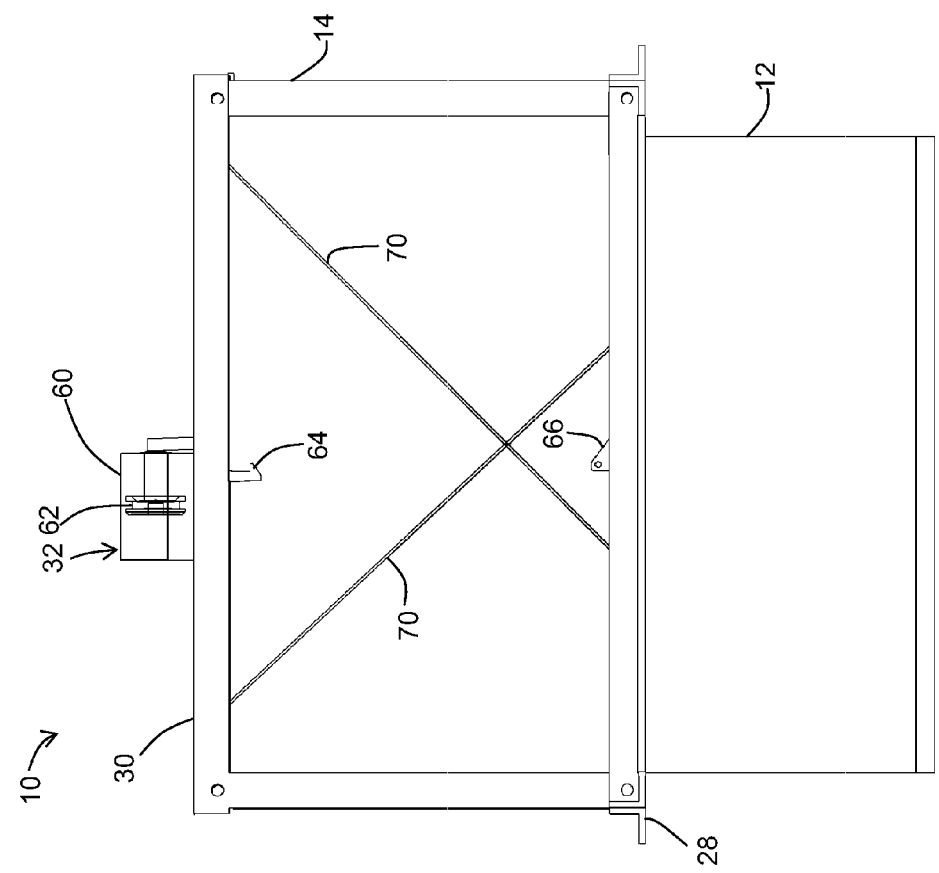
Fig. 4B
Fig. 4A

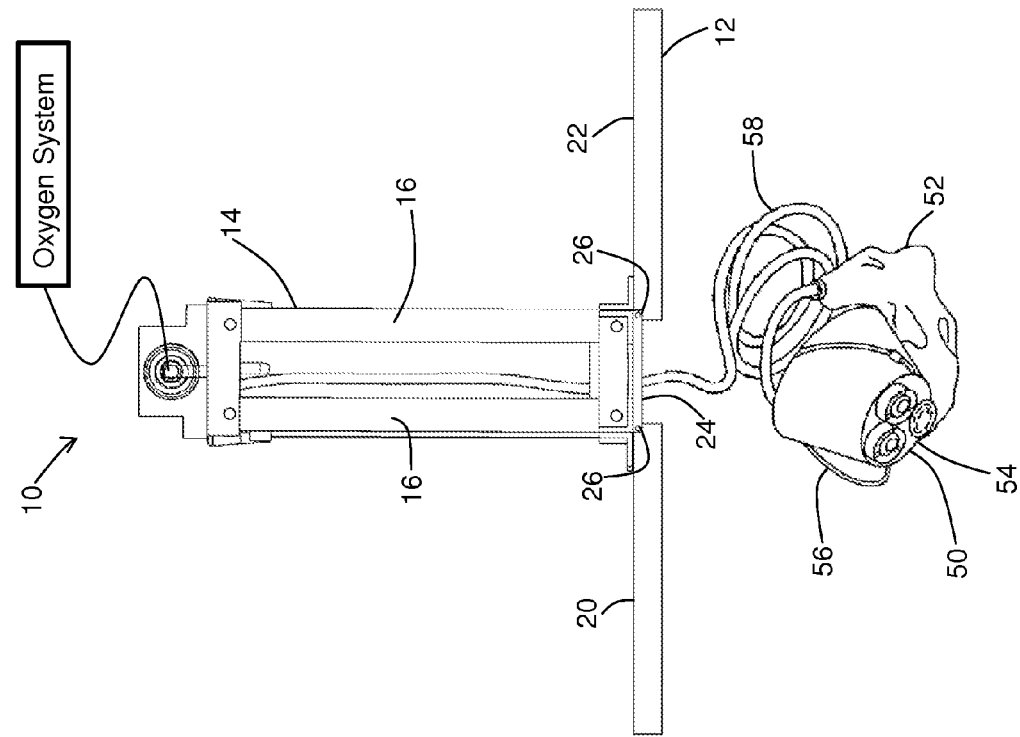
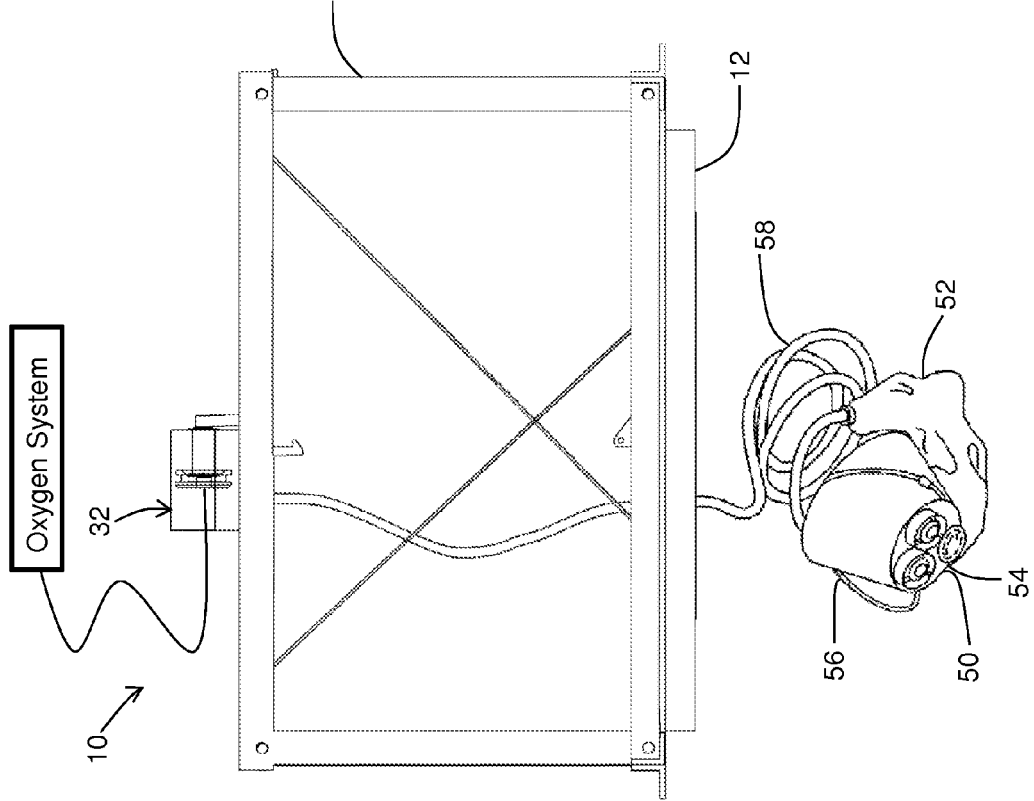

VERTICAL DROP OUT BOX METHOD AND APPARATUS

FIELD OF THE INVENTION

This invention relates to a method and apparatus for deploying an emergency breathing mask in an aircraft. The apparatus is automatically or manually operable to present the breathing mask to a user upon loss of cabin pressurization.

BACKGROUND OF THE INVENTION

Typical emergency breathing mask deployment systems (also known as drop out boxes) include a generally rectangular shaped storage container carrying a fluid valve assembly, one or more oronasal breathing masks and means for supporting masks in a stowed condition within container. In a conventional system, the mask deployment system is stowed in an overhead storage container directly over the user. Traditional mask deployment systems are mounted such that a broad side of a container, which houses the mask, is directed toward the cabin space. Upon a sudden loss of pressure, the aforementioned broad side of the container opens automatically and the mask is dropped out of the container and deployed to a user below.

However, the configuration of some aircraft prevents the mounting of a typically sized deployment system. Specifically, traditional vertical drop out boxes cannot always be accommodated due to limitations of overhead panel space, limitations in the space available in the airframe cross section, and considerations of the interior aesthetics of passenger aircraft cabins. Accordingly, there is a need for a method and apparatus that allows for the reliable deployment of a typical breathing mask system that reduces the need for overhead panel space, improves deployment reliability by ejecting the mass versus relying on gravity only, and that better fits the aesthetics of the aircraft cabin.

BRIEF SUMMARY OF THE INVENTION

The present invention meets the above-described need by providing a method and apparatus for storing breathing masks in a tall and narrow space and deploying the masks from that space. The system may also provide for a force other than gravity in deploying the masks. The present invention may be used in a ceiling mounted orientation where it can provide a force in addition to gravity for releasing the masks.

The apparatus may be embodied as a removable cartridge containing a breathing mask assembly housed within a frame. The cartridge is comprised of a first side and second side which can move relative to the frame. The first side includes a hinge. In operation, the cartridge slides relative to the frame and rotatably opens via the hinge after the cartridge substantially exits the frame. A breathing mask (or multiple masks) is released to a user after the first and second halves rotatably separate.

In an embodiment of the apparatus, the deployment of the cartridge is activated by oxygen pressure. In this manner, the cartridge or mask assembly, or both may be actively deployed, instead of being gravity dependent. The apparatus may also allow for an interior cosmetic cover that is independent of the mask deployment device. Further, the mask cartridge may be removable to allow for bench-top repacking of a mask.

The invention may also comprise a method of deploying a breathing mask, comprising the steps of: (1) providing a cartridge housed in a frame, the cartridge having a first side and a second side; (2) moving the cartridge substantially out of a frame; (3) rotating the first side and the second side about at least one hinge to separate the cartridge; and (4) deploying a breathing mask from the separated cartridge.

The apparatus and method reduces the area required in the overhead compartment of the interior of an aircraft. Furthermore, the invention may improve the aesthetics and minimize the size of the opening required to deploy the breathing mask. An additional benefit of the invention is that sliding movement of the cartridge may cause positive mask deployment without relying solely on gravity.

DESCRIPTION OF THE DRAWINGS

For a fuller understanding of the nature and objects of the invention, reference should be made to the following detailed description taken in conjunction with the accompanying drawings, in which:

FIG. 3A is a side view of the breathing gas deployment system of FIGS. 1A-1C with the cartridge depicted in an extended position;

FIG. 3B is an end view of the breathing gas deployment system of FIG. 3A;

FIG. 4A is a side view of the breathing gas deployment system of FIGS. 1A-1C with the cartridge depicted in a partially opened position (the breathing mask assembly is not shown);

FIG. 4B is an end view of the breathing gas deployment system of FIG. 4A;

FIG. 5A is a side view of the breathing gas deployment system of FIGS. 1A-1C with the cartridge depicted in a fully opened position and the breathing mask assembly released;

FIG. 5B is an end view of the breathing gas deployment system of FIG. 5A; and

DETAILED DESCRIPTION OF THE INVENTION

Figure 1A:
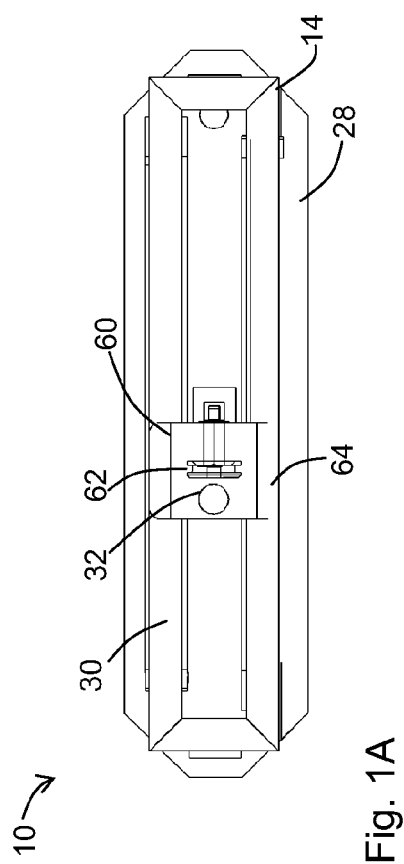
FIG. 1A is a top view of a breathing gas deployment system according to an embodiment of the present invention.
Figure 1C:
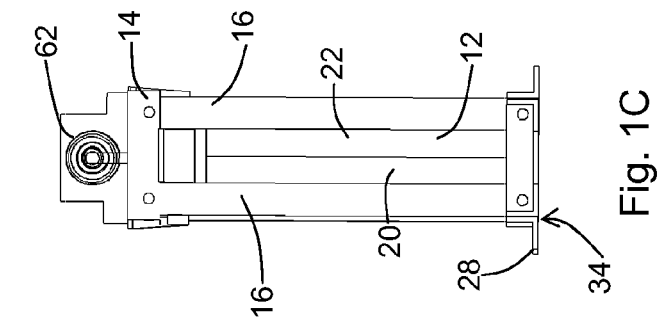
FIG. 1C is an end view of the breathing gas deployment system of FIGS. 1A and 1B.
Figure 1B:
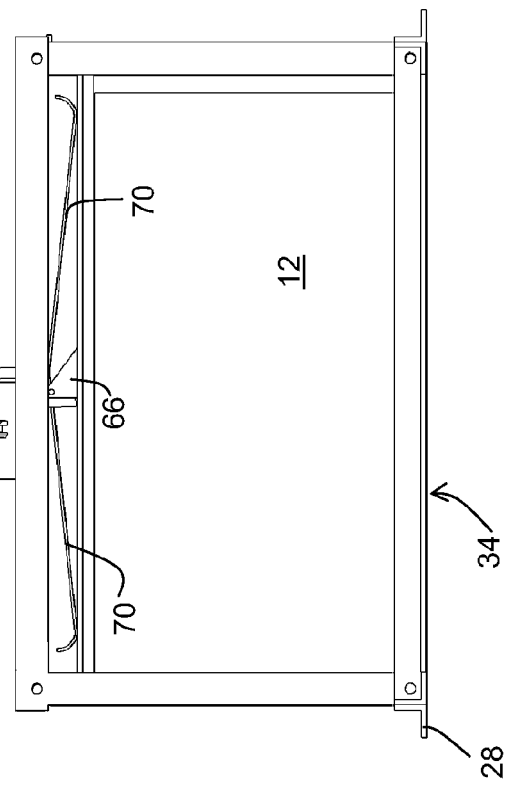
FIG. 1B is a side view of the breathing gas deployment system of FIG. 1A with the cartridge depicted in an initial, stowed position.

Referring to FIG. 1, a breathing gas deployment system 10 is depicted comprising a cartridge 12 housed within a rectangular frame 14. The cartridge 12 is displaceable relative to the frame 14 and may include guides 16 to allow the cartridge 12 to slide from an initial position within the frame 14 to a position outside of the frame (see, e.g., FIG. 5). The cartridge 12 contains at least one breathing mask assembly 50. Multiple breathing mask assemblies may also be stowed within a single cartridge 12. As will be evident to those of ordinary skill in the art, the breathing mask assembly 50 may include the following major components: a folded reservoir bag 52, an oronasal mask 54, a strap 56, and breathing conduit 58. The cartridge 12 may be configured to be removable from the frame 14 to allow for bench-top repacking of the breathing mask assembly 50 or assemblies after deployment. The cartridge 12 may be replaced by a replacement cartridge pre-packed with a breathing mask assembly.

The cartridge 12 comprises a first side 20 and a second side 22. The first and second sides 20, 22 may be configured such that the sides form a cavity when the sides are adjacent to one another. The cartridge 12 may also include an end wall 24, adjacent to the first side 20 and the second side 22. In this embodiment, the first side 20 and second side 22 each include a hinge 26 that connects the respective side 20, 22 to the end wall 24 (best shown in FIG. 5). Alternatively, the cartridge 12 may include only one hinge 26 which attaches the first side 20 to the end wall 24 or only one hinge 26 that attaches the first side 20 to the second side 22.

Regardless of the placement or number of hinges 26, the hinge 26 or hinges allow the first and second sides 20, 22 to rotate apart from one another once the cartridge 12 substantially exits the frame 14. The position at which the cartridge 12 must be displaced from the frame 14 such that the cartridge 12 can rotatably open, will depend on at least the placement of the hinge 26 or hinges, the size of the frame 14, and the size of the cartridge. In other words, the cartridge 12 may open when it has clearance to do so with respect to the frame 14. The cartridge 12 may also be configured to open once the cartridge 12 reaches a specific position (e.g. after the cartridge 12 has reached a bottom flange 28 of the frame 14).

The frame 14 houses the cartridge 12, and the frame is configured to be mounted in an overhead compartment of an aircraft. A bottom flange 28 may be configured to affix the frame to a panel of the overhead compartment. The dimensions of the envelope of an embodiment of the present invention may be, for example but not limited to, approximately 8.5 inches long by 5.5 inches tall by 2 inches wide. In such an embodiment, the cartridge 12 may be configured, for example, to be ejected from the side of the frame 14 which measures 8.5 inches by 2 inches. A top portion 30 of the frame 14 may be provided with an opening 32 for receiving a quick connect fitting that is in pneumatic communication with the oxygen delivery manifold such that, when connected, the oxygen delivery manifold of the aircraft is in pneumatic communication with the mask assembly 50. Opposite from the top portion 30 of the frame 14 is the bottom flange 28 of the frame 14 where the cartridge 12 exits the frame 14, and the mask assembly 50 exits the cartridge 12 during deployment. The bottom flange 28 may initially be covered by a removable substrate or cosmetic cover 34.

A cartridge ejection device 60 may be formed as part of the frame 14 or cartridge 12 or both. In a non-limiting example, a piston 62 may be placed on the top portion 30, the piston 62 having a latch 64 that communicates with a catch 66 located on the cartridge 12. In another embodiment, a solenoid-operated actuator may be used to release the cartridge from its stowed position within the frame. In another embodiment, the cartridge may be held by a mechanically operated latch capable of being released by the force of oxygen pressure. Other release mechanisms will be apparent to those having skill in the art.

The cartridge may include a supplemental mask ejection device such as a spring-biased piston. In this embodiment, a spring is released from a retention mechanism and provides a force on the piston when an electrical signal is given or when the oxygen flow is activated. This force ejects the cartridge from its stowed position.

One or more springs 70 may provide pre-loaded compression between the frame 14 and the cartridge 12. In such embodiments, once the cartridge 12 is released from its stowed position, for example by the release of a latch 64, the spring force will eject the cartridge 12 from its stowed position.

Figure 2B:
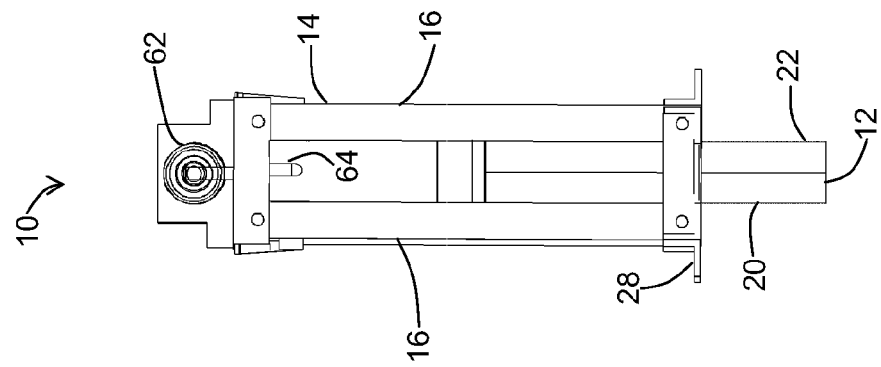
FIG. 2B is an end view of the breathing gas deployment system of FIG. 2A.
Figure 2A:
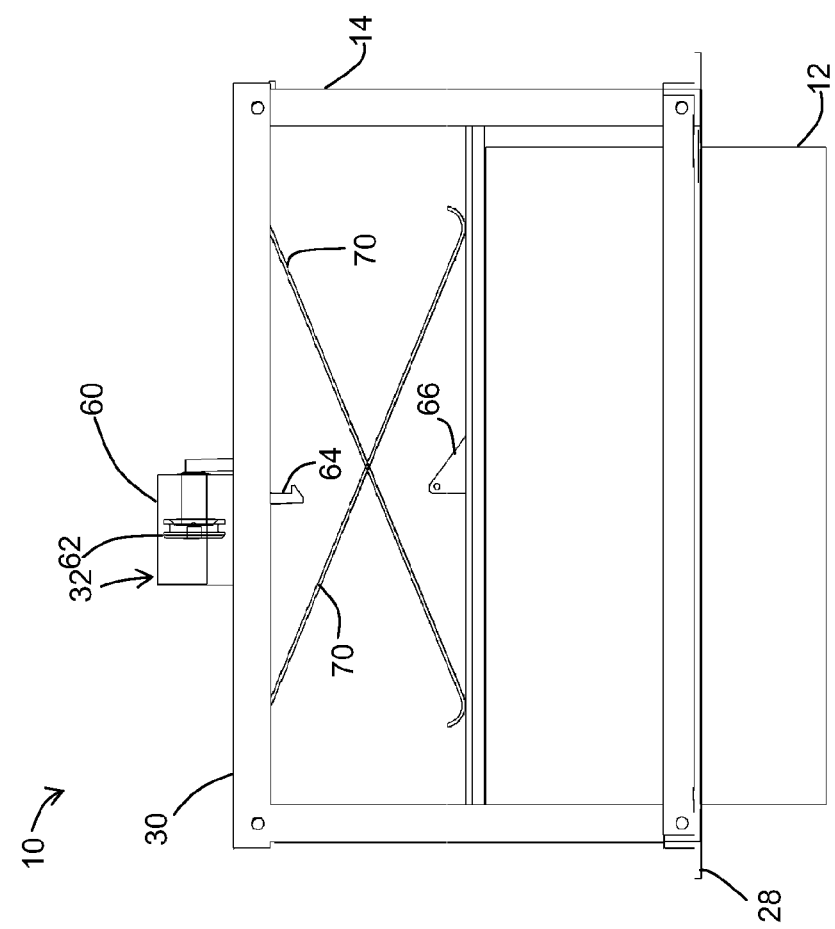
FIG. 2A is a side view of the breathing gas deployment system of FIGS. 1A-1C with the cartridge depicted in a partially extended position.

FIGS. 1 to 5 depict the apparatus 10 in various stages of deployment. FIG. 1 depicts the apparatus 10 in its stowed position. In this position, the cartridge 12 is housed within the frame 14. In this embodiment, the cartridge 12 is held in place by a piston 62 having a latch 64 that communicates with a catch 66 located on the cartridge 12. FIG. 2 shows the cartridge 12 after being released from the stowed position. In this non-limiting example, an oxygen line was pressurized which released the latch 64 to deploy the cartridge 12. FIG. 3 shows the cartridge 12 after substantially exiting the frame 14. Here, the cartridge 12 has stopped sliding at the bottom flange 28 of the frame 14. FIG. 4 shows the first side 20 and the second side 22 of the cartridge 12 beginning to open. Here, the first side 20 and the second side 22 have both begun to rotate relative to their respective hinges 26 that connect the first and second sides 20, 22 to the end wall 24. Lastly, FIG. 5 shows the cartridge 12 in a deployed position. At this point, both the first and second sides 20, 22 have rotated apart, and the breathing mask assembly 50 is deployed to a user.

Figure 6:
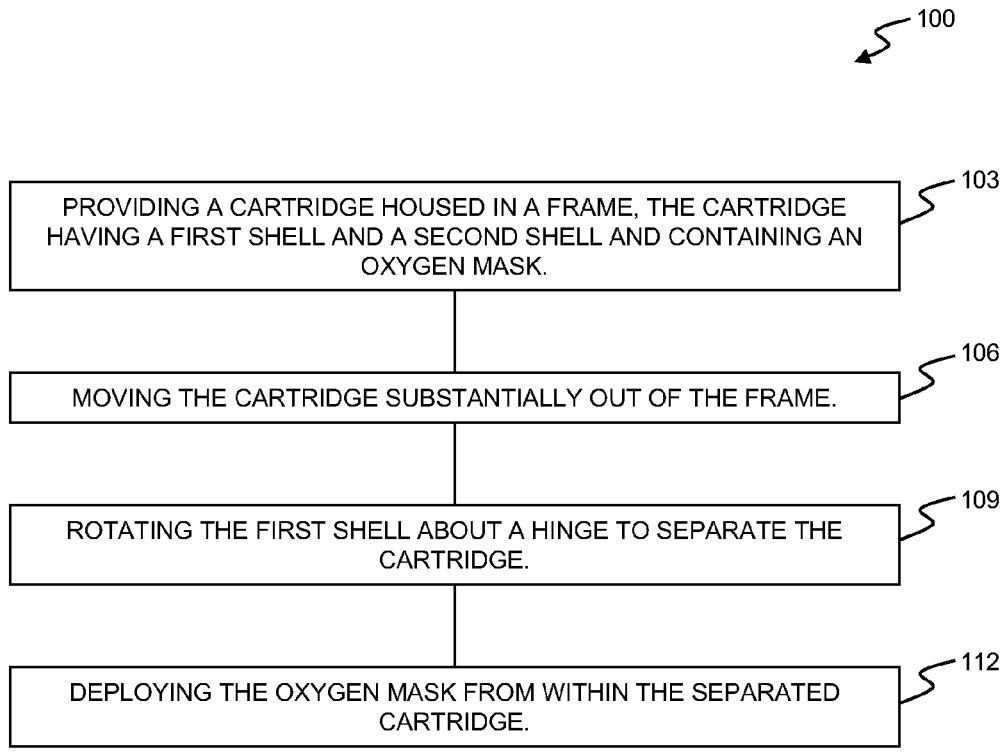
FIG. 6 is a flowchart depicting a method according to another embodiment of the present invention.

FIG. 6 depicts one example wherein the present invention is embodied as a method 100 for deploying a breathing mask. The method 100 comprises providing 103 a cartridge housed in a frame similar to that described above. The cartridge has a first side and a second side. The breathing mask to be deployed is contained within the cartridge. The cartridge is moved 106 substantially out of the frame. The movement may be actuated automatically or manually through action of an individual. The cartridge may slide from the frame to a point where the first and second sides are able to rotate. The first side is rotated 109 about a hinge. In this way, the first side may rotate with respect to the second side in order to expose the inside of the cartridge and the contents contained within. The second side may also be provided with a hinge and able to rotate with respect to the first side. The breathing mask is deployed 112 from within the cartridge. For example, when the first side is rotated with respect to the second side, the breathing mask may deploy by gravitational force, dropping down to the user below.

The cartridge may be pushed from an initial position within the frame by a biasing member. The biasing member may be a spring. The biasing member may be a force generating member. In another embodiment, the cartridge may be pushed from an initial position by way of gas pressure from an oxygen system.

The present invention may be embodied as a cartridge for use with a breathing gas deployment system having a frame. The cartridge has an end wall and a first side connected to the end wall by a hinge. The cartridge has a second side connected to the end wall by a hinge. The first side and the second side are configured such that the sides form a cavity when the sides are adjacent one another. A breathing mask assembly is housed within the cavity. The cartridge is configured for slidable insertion into the frame of the breathing gas deployment system.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A breathing gas deployment system, comprising:
a frame;
a removable cartridge housed within the frame, the cartridge displaceable in relation to the frame and including a first side having a first hinge, and a second side;
a breathing mask housed within the cartridge; and
wherein the first side rotatably separates from the second side about the hinge to release the breathing mask from the cartridge;
wherein the cartridge is configured to displace in relation to the frame during deployment of the breathing mask.

2. The breathing gas deployment system of claim 1, wherein the first side rotatably separates from the second side after the cartridge is displaced substantially outside of the frame.

3. The breathing gas deployment system of claim 1, wherein the frame includes a side wall having a first length and a bottom wall adjacent to the side wall having a second length, the second length being at least three times larger than the first length.

4. The breathing gas deployment system of claim 3, wherein the bottom wall includes an opening for the cartridge to exit the frame.

5. The breathing gas deployment system of claim 4, wherein the opening in the bottom wall is covered by a cosmetic cover.

6. The breathing gas deployment system of claim 1, wherein the frame includes a latch and the cartridge comprises a catch to engage the latch; and
wherein releasing the latch causes the cartridge to displace in relation to the frame.

7. The breathing gas deployment system of claim 6, wherein the frame includes a piston, the piston engaging the latch.

8. The breathing gas deployment system of claim 1, wherein the cartridge slidably engages the frame.

9. The breathing gas deployment system of claim 1, further comprising an oxygen system in fluid communication with the breathing mask, wherein pressure from the oxygen system causes a piston to release a latch on the cartridge, wherein releasing the latch allows the cartridge to displace in relation to the frame.

10. The breathing gas deployment system of claim 1, wherein the cartridge is removable from a manifold via quick connect connections.

11. The breathing gas deployment system of claim 1, further comprising one or more additional breathing masks housed within the cartridge.

12. The breathing gas deployment system of claim 1, wherein the second side includes a second hinge.

13. The breathing gas deployment system of claim 1, wherein the first side and the second side are connected by a connecting member.

14. The breathing gas deployment system of claim 13, wherein the first hinge and the second hinge are located on the connecting member.

15. A method for deploying a breathing mask, comprising the steps of:
providing a cartridge housed in a frame, the cartridge having a first side and a second side;
moving the cartridge substantially out of a frame;
rotating the first side and the second side about at least one hinge to separate the cartridge; and
deploying a breathing mask from within the separated cartridge;
wherein the cartridge is moved substantially out of the frame during deployment of the breathing mask.

16. The method of deploying a breathing mask of claim 15, wherein the cartridge is pushed substantially out of the frame by a biasing member.

17. The method of deploying a breathing mask of claim 16, wherein the biasing member comprises a spring.

18. The method of deploying a breathing mask of claim 16, wherein the biasing member comprises a force generating device.

19. The method of deploying a breathing mask of claim 15, further comprising activating oxygen pressure from an oxygen system to cause a piston to release a latch on the cartridge.

20. A cartridge for use with a breathing gas deployment system having a frame, the cartridge comprising:
an end wall having a catch member for mating with a latch mechanism and having an aperture sized to allow a tubing to pass through the end wall;
a first side of a clamshell hingedly connected to the end wall;
a second side of a clamshell hingedly connected to the end wall and disposed opposite the first side, the first side and the second side forming a cavity within the clamshell;
a breathing mask housed within the cavity of the clamshell;
wherein the cartridge is configured for slidable insertion into the frame of the breathing gas deployment system;
wherein rotation of the first side of the clamshell relative to the second side of the clamshell releases the breathing mask housed within the cavity of the clamshell; and
wherein the first side of the clamshell has a substantially similar shape as the second side of the clamshell.

* * * * *